United States Patent
Cirillo

(10) Patent No.: US 7,427,419 B2
(45) Date of Patent: Sep. 23, 2008

(54) PROCESS FOR DYEING OLIVES BY USE OF ERYTHROSINE

(75) Inventor: Francesco Cirillo, Cerignola (IT)

(73) Assignees: La Bella Di Cerignola S.C.A.R.L., Cerignola (IT); Vitalconserve S.R.L., Cerignola (IT)

( * ) Notice: Subject to any disclaimer, the term of this patent is extended or adjusted under 35 U.S.C. 154(b) by 483 days.

(21) Appl. No.: 11/109,727

(22) Filed: Apr. 20, 2005

(65) Prior Publication Data

US 2006/0240158 A1 Oct. 26, 2006

(51) Int. Cl.
*A23L 1/275* (2006.01)

(52) U.S. Cl. .................. 426/250; 426/268; 426/615

(58) Field of Classification Search ................ 426/250, 426/268, 539, 540, 615
See application file for complete search history.

(56) References Cited

U.S. PATENT DOCUMENTS

| | | | | |
|---|---|---|---|---|
| 4,177,294 A | * | 12/1979 | Lehmann et al. | 426/271 |
| 4,664,926 A | * | 5/1987 | Scrimshire | 426/270 |
| 4,883,679 A | * | 11/1989 | Sewon | 426/532 |
| 5,620,726 A | * | 4/1997 | Casamassima | 426/254 |
| 2003/0198717 A1 | * | 10/2003 | Sigal et al. | 426/250 |

* cited by examiner

*Primary Examiner*—Arthur L Corbin
(74) *Attorney, Agent, or Firm*—Young & Thompson

(57) ABSTRACT

A process for dyeing olives by use of erythrosine includes the following steps:
(i) de-bittering the olives;
(ii) immersing the olives in an aqueous erythrosine solution;
(iii) heating the solution and the olives contained therein;
(iv) allowing the solution to cool down, contemporarily intermittently blowing cold air into the aqueous erythrosine solution;
(v) washing olives;
(vi) pasteurizing the olives.

19 Claims, No Drawings

PROCESS FOR DYEING OLIVES BY USE OF ERYTHROSINE

FIELD OF THE INVENTION

The present invention relates to a process for dyeing olives by use of erythrosine, in order to obtain a uniform distribution of the color on their surface.

BACKGROUND OF THE INVENTION

Erythrosine (3',6'-dihydroxy-2',4',5',7'-tetraiodospiro (isobenzofuran-1(3H),9'-(9H)xanthene)-3-one sodium salt) is a well known dye in pharmaceuticals and alimentary field.

In particular, U.S. Pat. No. 5,620,726 teaches a process for coloring olives characterized in that, before immersing the olives in the erythrosine solution, they are subjected to a bleaching process using sulfurous anhydride or a citric acid solution then, after washing to remove all traces of the said sulfurous anhydride or a citric acid solution, the olives are immersed in a boiling aqueous erythrosine solution, then retrieved, washed to remove all traces of the colorant and packaged.

The sequence of the different steps of the process and the respect of the process parameters and conditions is presented in the patent as essential in order to prevent the finished product having a patchy appearance, that is to say, an uneven color, or to prevent it losing its color after a brief period of time, or during storage or when rubbed, for example, with a cotton pad soaked in water. In particular, before immersing the olives in the erythrosine solution, they are subjected to a bleaching process using sulfurous anhydride or a citric acid solution, this treatment allowing a very pale product to be obtained, ready for the subsequent coloring.

It has been now surprisingly found that a preliminary bleaching treatment is not necessary to avoid a non uniform distribution of the color on their surface, provided particular conditions are met during the dyeing process using erythrosine.

SUMMARY OF THE INVENTION

It is therefore the aim of the present invention to provide a process for dyeing olives by use of erythrosine, according to which the olives surface is uniformly colored and a preliminary treatment of bleaching is avoided.

This aim in achieved by immersing olives in an aqueous erythrosine solution, which is gently stirred by an intermittent flow of air bubbles. For the remaining features, the process is modified accordingly up to the packaging of olives.

The olives treated according to the process of the present invention does not undergo any particular chemical treatment, apart from dyeing and treatment preliminary to packaging, which could detrimentally modify their nutritional features. Further, the olives treated according to the process maintain their color for a long time.

It is therefore the object of the present invention a process for dyeing olives by use of erythrosine, characterized in that during the step of immersing olives in an aqueous erythrosine solution, an intermittent agitation of the solution is obtained by an intermittent flow of air bubbles.

DETAILED DESCRIPTION OF THE INVENTION

The process for dyeing olives by use of erythrosine according to the present invention comprises the following steps:

(i) de-bittering the olives by using caustic soda and a following lactic fermentation in brine (according to the known sivilian method), or (when using natural brown olives) by immersing the olives in a brine (concentration 7-8%) for 7-8 months (natural de-bittering); until, in both cases, the olives reach a pH value between 3.8 and 4.7;

(ii) immersing the olives in an aqueous erythrosine solution (weight ratio between aqueous erythrosine solution and olives ranging from 2:1 up to 4:1), the solution having an erythrosine concentration value between 0.012% and 0.025% by weight (12-25 g erythrosine/100 lt. water), (iii) heating for 60-120 minutes, up to a maximum temperature of 60-80° C., (iv) leaving the solution cool down, contemporarily intermittently blowing cold air into the aqueous erythrosine solution (5-10 minutes of blowing every 10-20 minutes intervals), (the total time the olives remain immersed in the aqueous erythrosine solution varying between 4 and 7 hours, including time needed for heating);

(v) washing olives by immersing them in an aqueous citric acid solution (weight ratio between aqueous citric acid solution and olives being 1:1), the solution having a citric acid concentration value between 0.1% and 0.3% by weight, until the olives reach a pH value between 3.8 and 4.2;

(vi) pasteurizing the olives (by packing the olives in glass or tin containers filled with an aqueous solution of salt (3.0-5.0% by weight), citric acid (0.1-0.3% by weight) and ascorbic acid (0.05-0.15% by weight), heating up to 90-95° C. for 60-70 minutes.

According to the process of the present invention, blowing cold air into the aqueous erythrosine solution not only assists the cooling of the solution, but also gently stirs the solution and the olives therein contained by an intermittent flow of air bubbles.

Further, according to the process of the present invention, in order to permit to the olives to reach the desired pH value during the washing step, it is preferred to change the aqueous citric acid solution once every 24 hours for three days. During this step, any particles of erythrosine which is not fixed to the olives is also removed.

After the pasteurizing step, the olives can be preserved for up to 36 months without incurring any decoloring or any change in their organoleptic feature.

The following example further illustrates the invention, without limiting it, according to its best embodiment.

EXAMPLE

Olives were de-bittered by immersing them in an aqueous solution of caustic soda (concentration 2.1%) for 15 hours. Afterwards they were washed with fresh water for three times within 24 hours and put into plastic barrels with a brine (concentration 9.0%) to be subjected to a natural lactic fermentation. After 40 days of fermentation, the pH value of the olives was 4.3.

The olives were then immersed in an aqueous erythrosine solution (weight ratio between aqueous erythrosine solution and olives being 2:1), the solution having an erythrosine concentration value of 0.022% by weight (22 g erythrosine/100 lt. water).

The solution was heated for 80 minutes, up to a temperature of 70° C. After reaching the temperature of 70° C., the solution was slowly cooled down, by closing the heating source. In the meantime, by means of a turbine, cold air was intermittently blown into the aqueous erythrosine solution (7 minutes of blowing every 15 minutes intervals). The total time the olives remained immersed in the aqueous erythrosine solution was 6 hours, including time needed for heating.

After this step, the olives were uniformly colored red.

The olives were subsequently washed by immersing them in an aqueous citric acid solution (weight ratio between aqueous citric acid solution and olives being 1:1), the solution having a citric acid concentration value of 0.2% by weight. The washing solution was changed once every 24 hours for three days.

This washing was necessary to reach a pH value of the olives of 4.0 and to remove any color which is not fixed to the drupes.

Following the above mentioned steps, the olives were ready to be pasteurized. Hence, the olives were packed in glass containers filled with an aqueous solution of salt (4.0% by weight), citric acid (0.2% by weight) and ascorbic acid (0.1% by weight). The containers were heated up to 92° C. for 60 minutes.

At this point, some containers were opened and the olives were examined. Their surface showed to be uniformly red colored. Other containers were left closed for 36 months. After this time period, some containers were opened and the olives were examined. The olives showed to be preserved without any variation of color or organoleptic features. In particular, their surface showed to be uniformly red colored.

What is claimed:

1. A process for dyeing olives by use of erythrosine without a preliminary bleaching treatment of the olives comprising the steps of:
   (i) de-bittering the olives;
   (ii) immersing the olives in an aqueous erythrosine solution;
   (iii) heating the solution and the olives contained therein;
   (iv) stopping the heating step so that the solution cools down, while intermittently blowing cold air into the aqueous erythrosine solution containing the olives;
   (v) washing the olives with an aqueous citric acid solution; and then
   (vi) pasteurizing the olives.

2. The process of claim 1, wherein in step (i) the de-bittering is obtained by using caustic soda and a following lactic fermentation in brine, until the olives reach a pH value between 3.8 and 4.7.

3. The process of claim 1, wherein in step (i) the de-bittering is obtained by immersing the olives in a brine with a salt concentration between 7% and 8% by weight for 7-3 months, until the olives reach a pH value between 3.3 and 4.7.

4. The process of claim 1, wherein in step (ii) the olives are immersed in an aqueous erythrosine solution having an erythrosine concentration value between 0.012% and 0.025% by weight.

5. The process of claim 4, wherein the weight ratio between the aqueous erythrosine solution and olives ranges between 2:1 and 4:1.

6. The process of claim 1, wherein in step (iii) the temperature of the solution and the olives contained therein is raised up to between 60 and 80° C.

7. The process of claim 6, wherein the time for hearing the solution and the olives contained therein ranges between 60 and 120 minutes.

8. The process of claim 1, wherein in step (iv) cold air is blown into the aqueous erythrosine solution far 5-10 minutes every 10-20 minutes.

9. The process of claim 1, wherein the total time the olives remain isuersed ira the aqueous erythrosine solution varies between 4 and 7 hours, including time needed for heating.

10. The process of claim 1, wherein in step (v) olives are inuersed in an aqueous citric acid solution.

11. The process of claim 10, wherein the citric acid concentration value ranges between 0.1% and 0.3% by weight.

12. The process of claim 10, wherein the weight ratio between the aqueous citric acid solution and the olives is 1:1.

13. The process of claim 10, wherein the aqueous citric acid solution is changed once every 24 hours until the olives reach a pH value between 3.8 and 4.2.

14. The process of claim 1, wherein in step (vi) the olives are pasteurized by packing them in glass or tin containers filled with an aqueous solution of salt, citric acid and ascorbic acid, and heating up to 90-95° C.

15. The process of claim 14, wherein the aqueous solution has the following composition: salt between 3.0% and 5.0% by weight, citric acid between 0.1% and 0.3% by weight and ascorbic acid between 0.05% and 0.15% by weight, the remaining part being water.

16. The process of claim 14, wherein in step (vi) heating is performed for 60-70 minutes.

17. The process of claim 1, wherein after step (iv) the olives are red in color.

18. The process of claim 1, wherein the cold air of step (iv) cools and stirs the solution and the olives.

19. A process for dyeing olives by use of erythrosine without a preliminary bleaching treatment of the olives comprising the steps of:
   (i) de-bittering the olives;
   (ii) immersing the olives in an aqueous erythrosine solution;
   (iii) heating the solution with the olives immersed therein;
   (iv) blowing cold air into the heated solution containing the olives to cool and stir the solution and the olives;
   (v) washing the cooled olives with an aqueous citric acid solution; and then
   (vi) pasteurizing the olives, wherein the pasteurized olives are red in color.

* * * * *